United States Patent
Zama et al.

(10) Patent No.: US 12,435,245 B2
(45) Date of Patent: Oct. 7, 2025

(54) LAMINATE AND HOT MELT-TYPE ADHESIVE LABEL

(71) Applicant: YUPO CORPORATION, Tokyo (JP)

(72) Inventors: Takahiro Zama, Ibaraki (JP); Rika Watanabe, Ibaraki (JP)

(73) Assignee: YUPO CORPORATION, Tokyo (JP)

( * ) Notice: Subject to any disclaimer, the term of this patent is extended or adjusted under 35 U.S.C. 154(b) by 764 days.

(21) Appl. No.: 17/763,004

(22) PCT Filed: Sep. 25, 2020

(86) PCT No.: PCT/JP2020/036246
§ 371 (c)(1),
(2) Date: Mar. 23, 2022

(87) PCT Pub. No.: WO2021/060458
PCT Pub. Date: Apr. 1, 2021

(65) Prior Publication Data
US 2022/0372338 A1    Nov. 24, 2022

(30) Foreign Application Priority Data
Sep. 27, 2019 (JP) .................. 2019-176349

(51) Int. Cl.
*C09J 7/29* (2018.01)
*B32B 5/18* (2006.01)
(Continued)

(52) U.S. Cl.
CPC .................. *C09J 7/29* (2018.01); *B32B 5/18* (2013.01); *B32B 27/065* (2013.01); *B32B 27/08* (2013.01); *B32B 27/32* (2013.01); *C09J 7/35* (2018.01); *B32B 2255/10* (2013.01); *B32B 2255/26* (2013.01); *B32B 2307/732* (2013.01);
(Continued)

(58) Field of Classification Search
CPC ........ B32B 27/065; B32B 27/325; C09J 7/26; C09J 7/35
See application file for complete search history.

(56) References Cited

U.S. PATENT DOCUMENTS

| 2015/0174865 | A1 | 6/2015 | Hatanaka et al. |
| 2016/0303833 | A1* | 10/2016 | Wang ........................ B32B 5/18 |
| 2017/0140676 | A1* | 5/2017 | Iwasawa ................ B32B 27/36 |

FOREIGN PATENT DOCUMENTS

| EP | 1 174 262 A1 | 1/2002 |
| JP | 11-979 | 1/1999 |

(Continued)

OTHER PUBLICATIONS

Official Communication issued in International Bureau of WIPO Patent Application No. PCT/JP2020/036246, dated Dec. 8, 2020, along with an English translation thereof.
(Continued)

*Primary Examiner* — Zachary M Davis
(74) *Attorney, Agent, or Firm* — GREENBLUM & BERNSTEIN, P.L.C.

(57) ABSTRACT

Provided is a laminate and a hot melt-type adhesive label that suppress curling due to swelling while having a pulp-paper feel. The laminate includes a porous substrate layer and an adhesive resin receiving layer on one side of the porous substrate layer, and the adhesive resin receiving layer contains an amorphous resin.

14 Claims, 2 Drawing Sheets

(51) Int. Cl.
  *B32B 27/06*   (2006.01)
  *B32B 27/08*   (2006.01)
  *B32B 27/32*   (2006.01)
  *C09J 7/35*    (2018.01)

(52) U.S. Cl.
  CPC ....... *B32B 2307/75* (2013.01); *B32B 2405/00* (2013.01); *B32B 2519/00* (2013.01); *C09J 2203/334* (2013.01); *C09J 2423/006* (2013.01); *C09J 2479/023* (2013.01); *C09J 2495/006* (2013.01)

(56) References Cited

FOREIGN PATENT DOCUMENTS

| | | |
|---|---|---|
| JP | 2014-040094 | 3/2014 |
| JP | 2015-074713 | 4/2015 |
| JP | 2019-130729 | 8/2019 |
| WO | 2016/168387 A1 | 10/2016 |

OTHER PUBLICATIONS

SESR issued in EP Patent Application No. 20868811.9, Sep. 1, 2023.

\* cited by examiner

LAMINATE AND HOT MELT-TYPE ADHESIVE LABEL

TECHNICAL FIELD

The present invention relates to a laminate and a hot melt-type adhesive label.

BACKGROUND ART

Labels may be affixed to products and the like for identification and to impart design properties. Such labels generally have an adhesive layer on a resin film. Hot melt-type adhesives are known as adhesives used in the adhesive layer (see, for example, Patent Literature 1).

On the other hand, an opaque resin film having fine pores is provided as synthetic paper. Such a porous resin film has a pulp paper-like feel while being a resin film, and is used as printing paper in the same way as pulp paper.

CITATION LIST

Patent Literature

Patent Literature 1: Japanese Patent Laid-Open No. 2015-74713

SUMMARY OF INVENTION

Technical Problem

However, when an attempt was made to use the porous synthetic paper described above as the substrate of an adhesive labels, it was discovered that the adhesive label curled several days after the adhesive layer was provided. It is believed that the curling may have occurred due to a plasticizer component normally used in the adhesive layer migrating to the substrate, and then penetrating therein to cause the substrate to swell.

It is an object of the present invention to provide a laminate and a hot melt-type adhesive label that suppress curling due to swelling described above while having a pulp-paper feel.

Solution to Problem

As a result of diligent investigation by the present inventors to achieve the above object, it was found that the above object can be achieved by laminating a layer containing an amorphous resin on the porous substrate layer surface of the side where the hot melt-type adhesive layer is provided, thereby completing the present invention.

That is, the present invention is as follows.
(1) A laminate comprising: a porous substrate layer; and an adhesive resin receiving layer on one side of the porous substrate layer,
  wherein the adhesive resin receiving layer contains an amorphous resin.
(2) The laminate according to (1), wherein
  the amorphous resin is a thermoplastic resin having a dissolution parameter of 11 or less.
(3) The laminate according to (1) or (2), wherein
  the amorphous resin is a cyclic olefin-type resin or a petroleum resin.
(4) The laminate according to any (1) to (3), wherein
  the adhesive resin receiving layer further contains a crystalline resin.
(5) The laminate according to (4), wherein
  the amorphous resin in the adhesive resin receiving layer is arranged in a layered manner in the crystalline resin.
(6) The laminate according to (4) or (5), wherein
  a content of the crystalline resin in the adhesive resin receiving layer is 20 to 85% by mass based on a total amount of the amorphous resin and the crystalline resin.
(7) The laminate according to any of (1) to (6) comprising:
  a first intermediate layer on an opposite side to the adhesive resin receiving layer of the porous substrate layer; and
  a second intermediate layer between the porous substrate layer and the adhesive resin receiving layer.
(8) The laminate according to (7), wherein
  a ratio of a thickness of the first intermediate layer to a thickness of the second intermediate layer is 1.2 to 100.
(9) The laminate according to any of (1) to (8), comprising a primer layer on the adhesive resin receiving layer,
  wherein the primer layer contains a polyethyleneimine.
(10) A hot melt-type adhesive label comprising a laminate, wherein
  the laminate comprises an adhesive resin receiving layer containing an amorphous resin between a hot melt-type adhesive layer containing a plasticizer and a porous substrate layer.
(11) The hot melt-type adhesive label according to (10), wherein
  the amorphous resin is a thermoplastic resin having a dissolution parameter of 11 or less.
(12) The hot melt-type adhesive label according to (10) or (11), wherein
  the amorphous resin is a cyclic olefin-type resin or a petroleum resin.

Advantageous Effects of Invention

According to the present invention, there can be provided a laminate and a hot melt-type adhesive label that suppress curling due to swelling while having a pulp-paper feel.

DESCRIPTION OF EMBODIMENT

Hereinafter, the laminate and hot melt-type adhesive label of the present invention will be described in detail. However, the description of the constituent elements described below is an example (representative example) of the present invention, and the present invention is not specific to the subject matter of that description.

In the following description, the term "(meth)acrylic" refers to both acryl and methacryl.

(Laminate)

The laminate of the present invention has a porous substrate layer and an adhesive resin receiving layer on one side of the porous substrate layer.

The laminate of the present invention is an opaque laminate due to the fact that the substrate layer is porous, and due to its opacity, the laminate has a pulp paper-like feel. The term opaque here means having an opacity of 70% or more. The opacity is preferably 85% or more from the viewpoint of obtaining the same feel as pulp paper. The opacity is a value obtained by, in accordance with JIS P8138, placing black and white standard plates on the back of the laminate, irradiating with light, and expressing the reflectance of the light as a percentage.

<Porous Substrate Layer>

The porous substrate layer has a porous structure, which imparts opacity and whiteness to the laminate. As a result, the laminate can be given a pulp paper-like feel.

The porous substrate layer is not particularly limited as long as it can impart strength to the laminate. For example, the porous substrate layer can be composed of a thermoplastic resin. The porous substrate layer preferably contains a filler, from the viewpoint of pore formation. Examples of a method for forming such a porous substrate layer include a method of stretching a sheet including a thermoplastic resin and a filler. When forming a porous structure by stretching, from the viewpoint of imparting opacity and whiteness to laminate, it is preferred that the porous substrate layer is biaxially stretched.

The porosity of the porous substrate layer is, from the viewpoint of opacity and weight reduction, preferably 1% or more, more preferably 10% or more, and further preferably 20% or more. On the other hand, from the viewpoint of stability during stretch-molding, the porosity is preferably 60% or less, more preferably 55% or less, further preferably 50% or less, and particularly preferably 40% or less.

The porosity means the area ratio of pores to the entire layer as determined by observing an arbitrary cross section of the target layer with a scanning electron microscope.

<<Thermoplastic Resin>>

Examples of the thermoplastic resin include polyolefin-type resins, polyester-based resins, polyamide-based resins, polyvinyl chloride resins, polystyrene resins, and polycarbonate resins. The porous substrate layer preferably includes a polyolefin-type resin or a polyester-based resin as the thermoplastic resin, and more preferably includes a polyolefin-type resin.

Examples of the polyolefin-type resin include polypropylene resins and polyethylene resins. From the viewpoint of moldability and mechanical strength, a polypropylene resin is preferred.

Examples of the polypropylene resin include propylene homopolymers such as isotactic homopolypropylene and syndiotactic homopolypropylene obtained by homopolymerizing propylene, and propylene copolymers obtained by copolymerizing propylene as a main component, and an α-olefin such as ethylene, 1-butene, 1-hexene, 1-heptene, 1-octene, and 4-methyl-1-pentene.

Examples of the polyester-based resin include polyethylene terephthalate, polybutylene terephthalate, and polyethylene naphthalate.

Examples of the polyamide-based resin include nylon-6, nylon-6,6, nylon-6,10, and nylon-6,12.

The above-described thermoplastic resins can be used singly or in combinations of two or more thereof.

<<Filler>>

Examples of the filler include an inorganic filler and an organic filler, and an inorganic filler is preferred.

Examples of the inorganic fillers include heavy calcium carbonate, light calcium carbonate, calcined clay, silica, diatomaceous earth, white clay, talc, titanium oxide such as rutile titanium dioxide, barium sulfate, aluminum sulfate, zinc oxide, magnesium oxide, mica, sericite, bentonite, sepiolite, vermiculite, dolomite, wollastonite, and glass fibers. Among these, heavy calcium carbonate, clay, or diatomaceous earth, and in particular heavy calcium carbonate is preferred due to good pore formability thereof. For the purpose of dispersibility improvement and the like, the surface of the inorganic filler may be surface-treated with a surface treatment agent such as a fatty acid.

Examples of the organic fillers include polyethylene terephthalate, polyethylene naphthalate, polybutylene terephthalate, polyamides, polycarbonates, polystyrene, cyclic olefin homopolymers, ethylene-cyclic olefin copolymers, polyethylene sulfide, polyimides, polymethacrylates, polyethyl ether ketone, polyphenylene sulfide, and melamine resins.

The filler that the porous substrate layer contains may be one or a combination of two or more of the above inorganic fillers, or may be one or a combination of two or more of the above organic fillers. Further, the filler may be a combination of the inorganic filler and the organic filler.

From the viewpoint of increasing the opacity or degree of whiteness of the porous substrate layer, the content of the filler in the porous substrate layer is preferably 10% by mass or more, and more preferably 15% by mass or more. From the viewpoint of increasing the uniformity of forming the porous substrate layer, the content of the filler in the porous substrate layer is preferably 70% by mass or less, more preferably 60% by mass or less, further preferably 50% by mass or less, and particularly preferably 30% by mass or less.

The average particle size of the inorganic filler or the organic filler is, from the viewpoint of the ease of the formation of pores, preferably 0.01 μm or more, more preferably 0.05 μm or more, and further preferably 0.10 μm or more. From the viewpoint of imparting mechanical strength such as tear resistance, the average particle size of the inorganic filler or the organic filler is preferably 15 μm or less, more preferably 5 μm or less, and further preferably 2 μm or less.

The average particle size of the inorganic filler is a volume-average particle size corresponding to 50% in volume accumulation (cumulative 50% particle size) measured by a particle measuring apparatus, for example, a laser diffraction particle size distribution measuring apparatus (Microtrac, manufactured by Nikkiso Co., Ltd.). The average particle size of the organic filler is the average dispersed particle size when the organic filler is dispersed in the thermoplastic resin by melting and kneading, and dispersion. For the average dispersed particle size, a cut surface of the thermoplastic resin film containing the organic filler is observed by an electron microscope, the maximum diameters of at least 10 particles are measured, and the average dispersed particle size can be obtained as their average value.

<<Other Additives>>

The porous substrate layer can contain additives according to the purpose, for example, an antioxidant such as a sterically hindered phenol, phosphorus, amine, and sulfur antioxidant; a light stabilizer such as a sterically hindered amine, benzotriazole-type, and benzophenone-type light stabilizer; a dispersing agent; a lubricant; and an antistatic agent.

From the viewpoint of suppressing a decrease in printability while obtaining sufficient effects of the additives, the content of the additives in the porous substrate layer can usually be 0.001 to 3% by mass independently for each type of additive.

The thickness of the porous substrate layer is, from the viewpoint of suppressing the occurrence of wrinkles during printing, preferably 20 μm or more, and more preferably 40

μm or more. Further, from the viewpoint of suppressing peeling that occurs when affixing to a curved surface due to too high stiffness, the thickness of the porous substrate layer is preferably 200 μm or less, and more preferably 150 μm or less.

The porous substrate layer may be a single-layer structure or a multilayer structure. In the case of a multilayer structure, the type and content of the composition of each layer may be the same or may be different.

<Adhesive Resin Receiving Layer>

An adhesive resin receiving layer is provided on one side of the porous substrate layer. A hot melt-type adhesive label (hereinafter, sometimes simply referred to as "adhesive label") is produced by providing a hot melt-type pressure-sensitive adhesive layer (hereinafter, sometimes simply referred to "adhesive layer") on the surface of the adhesive resin receiving layer side of the laminate. That is, the adhesive resin receiving layer serves as the base layer of the adhesive layer in the adhesive label.

The adhesive resin receiving layer according to the present invention contains an amorphous resin. As a result, plasticizer migrating from the adhesive layer provided on the adhesive resin receiving layer can be incorporated in and held by the amorphous resin. Therefore, the penetration of the plasticizer into the laminate can be suppressed.

In general, due to their nature, resin films tend to swell when in contact with a plasticizer component. In the case of a resin film not having internal pores, it is difficult for the plasticizer component to penetrate into the film, and the swelling of the resin film does not occur immediately after contact with the plasticizer component, but proceeds after some time has elapsed. As a result, the phenomenon of curling is often not a problem. On the other hand, in the case of a porous resin film such as the porous substrate layer according to the present invention, the pores make it easier for the plasticizer component to penetrate into the film, and swelling tends to occur in a relatively short time. As a result, the phenomenon of curling due to swelling becomes apparent. Therefore, by providing an adhesive resin receiving layer on the porous substrate layer to suppress the penetration of the plasticizer into the porous substrate layer which tends to swell, it is possible to provide a laminate which suppresses the manifestation of curling due to swelling for a long time while maintaining the pulp-paper feel of the porous substrate layer.

As used herein, "crystalline resin" refers to a resin having an oriented molecular chain portion (crystal portion). In contrast, "amorphous resin" refers to a resin that does not have such a crystal portion, or a resin having an extremely small amount if it does have such a crystal portion. Whether or not the resin has a crystalline portion to the extent that it has crystalline properties can be determined based on whether or not the resin has a melting point, that is, whether or not it has a clear melting peak in differential scanning calorimetry (DSC) heated at a constant rate. As used herein, if the peak area of the melting peak in DSC is 20 J/g or more, the resin is determined as having a clear melting peak.

<<Amorphous Resin>>

Amorphous resins have a structure in which the molecular chains are irregularly entangled, so that a low-molecular weight component can be incorporated into gaps between the molecular chains when the amorphous resin comes into contact with the low-molecular weight component.

The amorphous resin is a resin having substantially no crystallized portion, usually having a degree of crystallinity of 10% or less, preferably 5% or less, more preferably 1%, and further preferably 0%.

The amorphous resin is preferably a thermoplastic resin having a dissolution parameter of 11 or less. The dissolution parameter is also called the SP value. The SP value of the plasticizer is usually 10 or less, as described later, and the closer the SP value of the amorphous resin is to the plasticizer, the easier it is for the amorphous resin to incorporate the plasticizer. As a result, it is easier to further suppress the penetration of the plasticizer into the laminate and the occurrence of curling due to swelling.

The SP value of the amorphous resin is, from the viewpoint of incorporating the plasticizer, preferably 10 or less, more preferably 9.5 or less, further preferably 9.0 or less, and particularly preferably to be 8.0 or less. Further, the above SP value can be 6.5 or more, and may even be 7.0 or more.

The SP value is a value calculated by the calculation method proposed by Small, and refers to, when the molar heat of evaporation of a liquid is $\Delta H$ and the molar volume is V, the amount $\delta$ $((cal/cm^3)^{1/2})$ defined by the following equation.

$$\delta = (\Delta H/V)^{1/2} = \rho \times (\Sigma Fi)/M$$

In the equation, $\rho$ means density (g/cm$^3$), Fi means molar attraction force $((cal/cm^3)^{1/2}/mol)$, and M means the molecular weight of the repeating unit (g/mol), respectively.

The molar attraction force represented by Fi is, for example, 214 for —CH$_3$, 133 for —CH$_2$—, 28 for —CH=, −93 for =C=, 735 for —C$_6$H$_5$, 270 for —Cl, and 275 for =C=O.

The SP value of the thermoplastic resin depends on the structure and content ratio of the repeating unit, but for example is about 7.6 for amorphous propylene-based copolymer resins, about 7.2 for cyclic olefin-type resins, about 7.0 for petroleum resins, about 8.6 to 9.7 for polystyrene resins, about 9.2 for polymethyl (meth)acrylate resins, about 7.9 to 8.1 for polyethylene resins, about 8.1 for crystalline polypropylene resins, about 8.5 for the complete crystal portion of a polypropylene resin, about 9.6 for polyvinyl chloride resins, about 9.6 to 10 for polycarbonate resins, about 10.7 for polyethylene terephthalate resins, and about 11.0 for nylon 6.

Therefore, the amorphous resin preferably includes at least one resin selected from the group consisting of a cyclic olefin-type resin, a petroleum resin, a polystyrene-based resin, a polyester resin such as polyethylene terephthalate resin, an amorphous propylene-based copolymer resin, and a polymethyl (meth)acrylate resin, more preferably includes at least one resin selected from the group consisting of a cyclic olefin-type resin, a petroleum resin, and a polystyrene resin, further preferably includes a cyclic olefin-type resin or a petroleum resin, and particularly preferably includes a cyclic olefin-type resin. These amorphous resins may be used singly or in combinations of two or more thereof.

Examples of the cyclic olefin-type resin include a ring-opening polymer derived from a cyclic olefin represented by the following formula (1), a hydride of such polymer, and an addition polymer of a cyclic olefin-type monomer represented by formula (1) and ethylene. The SP value of such a cyclic olefin-type resin is close to the SP value of the plasticizer in the adhesive layer, and has a high affinity with the plasticizer. Therefore, although the cyclic olefin-type resin tends to incorporate the plasticizer into the resin molecule, an increase in the volume due to swelling tends not to occur, and so deformation of the resin and its surrounding members tends to be suppressed.

[Formula 1]

(1)

In formula (1), n is 0 or a positive integer, and $R^1$ to $R^{12}$ each independently represent an atom or substituent selected from the group consisting of a hydrogen atom, a halogen atom, and a hydrocarbon group. $R^9$ to $R^{12}$ may bind to each other to form a single ring or a polycyclic group, and the single ring or polycyclic group may have a double bond. $R^9$ and $R^{10}$ or $R^{11}$ and $R^{12}$ may together form one alkylidene group.

Examples of the petroleum resin include a high-grade unsaturated hydrocarbon compound present in high-temperature pyrolytic oils such as naphtha, for example, an unsaturated hydrocarbon resin obtained by polymerizing, with an acid catalyst, a raw material mainly consisting of the C5 or C9 fraction of the fractions that remain after the necessary fractions have been collected from the pyrolytic oil, specifically butadiene, piperylene, isoprene, dicyclopentadiene, terpene, styrene, methyl styrene, vinyl toluene, indene, methylindene, a mixture of these and the like, and a saturated hydrocarbon resin obtained by hydrogenating such an unsaturated hydrocarbon resin.

Examples of the polystyrene-based resin include polystyrene, high-impact polystyrene, a styrene graft-polyethylene copolymer, a styrene graft-polypropylene copolymer, a styrene-acrylonitrile copolymer, an acrylonitrile-butadiene-styrene copolymer, and a styrene-butadiene resin.

The content of the amorphous resin in the adhesive resin receiving layer is, from the viewpoint of incorporating the plasticizer component and preventing penetration into the laminate, preferably 8% by mass or more, more preferably 15% by mass or more, and further preferably 30% by mass or more. Further, the content of the amorphous resin in the adhesive resin receiving layer may be 100% by mass, but is preferably 99% by mass or less, more preferably 80% by mass or less, further preferably 70% by mass or less, and particularly preferably 60% by mass or less.

The laminate can include the amorphous resin only in the adhesive resin receiving layer from the viewpoint of cost and the like. In this case, an amorphous resin having a different shrinkage rate is present only on the adhesive resin receiving layer side with respect to the porous substrate layer, and in addition to swelling due to the plasticizer, curling can also occur due to the difference in the shrinkage rate of the component materials. However, by setting the content of the amorphous resin in the adhesive resin receiving layer to be no greater than the above-described upper limit value, the occurrence of such curling tends to be prevented.

<<Crystalline Resin>>

The adhesive resin receiving layer preferably further contains a crystalline resin. Crystalline resins have less swelling due to a plasticizer and suppress penetration into the laminate more easily.

Examples of the crystalline resin include general common resins such as polyolefin-type polymers, polyester-based polymers, polyamide-based polymers, and (meth)acrylic acid copolymers, among which a polyolefin-type polymer is preferred.

Examples of the polyolefin-type polymer include a homopolymer of an α-olefin having 2 to 8 carbon atoms, such as ethylene, propylene, 1-butene, 1-hexene, 1-heptene, 1-octene, 4-methyl-1-pentene, and 3-methyl-1-pentene; a copolymer of 2 to 5 types of these α-olefins; and the like. Among these, it is preferred to use at least one of an ethylene-based resin including ethylene as a raw material monomer and a propylene-based resin including propylene as a raw material monomer, and a propylene homopolymer, a propylene/ethylene random copolymer, or high-density polyethylene is more preferred because molding workability is good.

Examples of the polyester-based polymer include polyethylene terephthalate resin, polybutylene terephthalate resin, and polyethylene naphthalate.

Examples of the polyamide-based polymer include nylon-6, nylon-6,6, nylon-6,10, and nylon-6,12.

The crystalline resin is a resin that is not an amorphous resin, and which preferably has a degree of crystallinity of 40 to 95%. For example, if the crystalline resin is a propylene homopolymer, its degree of crystallinity is preferably 45 to 70%, and more preferably 50 to 60%. When the crystalline resin has such a degree of crystallinity, incorporation of the plasticizer into the amorphous resin can be further promoted. The degree of crystallinity of the resin can be derived from the following equation (a) based on the heat of fusion Hm (J/g) of the resin measured by DSC (differential scanning calorimetry) and the heat of fusion Hp (J/g) when the resin is a complete crystal (degree of crystallinity 100%).

$$\text{Degree of crystallinity}(\%) = Hm/Hp \times 100 \qquad (a)$$

Hp in equation (a) is determined as a theoretical value specific to each resin. The Hp of the polypropylene homopolymer is 209 (J/g), and the Hp of high density polyethylene is 293 (J/g). Further, Hm is measured and calculated as the melting peak area when a resin is heated under conditions of a rate of temperature increase of 10° C./min and a nitrogen flow rate of 100 mL/min until exceeding the melting point of the resin by 30° C., cooled at 20° C./min, and then reheating under the same conditions as described above.

The adhesive resin receiving layer preferably uses the crystalline resin in combination with the amorphous resin. When the crystalline resin is used in combination, from the viewpoint of suppressing penetration of the plasticizer into the laminate, the content of the crystalline resin based on the total amount of the amorphous resin and the crystalline resin can exceed 0% by mass, preferably 20% by mass or more, more preferably 30% by mass or more, and further preferably 40% by mass or more. Further, from the viewpoint of sufficiently incorporating the plasticizer into the amorphous resin, the content of the crystalline resin based on the total amount of the amorphous resin and the crystalline resin can be 85% by mass or less, preferably 80% by mass or less, more preferably 75% by mass or less, and further preferably 60% by mass or less.

When the amorphous resin and the crystalline resin are both included, it is preferred that the amorphous resin is arranged in a dispersed manner in a layered manner in the crystalline resin in the adhesive resin receiving layer. By arranging in such a manner, the plasticizer migrating from the adhesive layer can be diffused in the planar direction of the laminate by the crystalline resin. As a result, the amount of plasticizer incorporated by the amorphous resin can be made uniform in the planar direction of the laminate.

The structure in which the amorphous resin is arranged in a layered manner in the crystalline resin can be obtained by a method such as extrusion molding, stretching of a mixed resin including both the amorphous resin and the crystalline resin at a predetermined ratio. The arrangement structure of the resin can be confirmed by TEM observation of a cross section when the laminate is cut in the thickness direction.

<<Filler>>

The adhesive resin receiving layer can further contain a filler. When the adhesive resin receiving layer contains a filler, the content of the high-cost amorphous resin can be reduced, and the occurrence of curling due to a difference in the shrinkage rate of the constituent materials tends to be suppressed. Further, the opacity can be improved, and the occurrence of appearance defects called sharkskin or interface roughness can be suppressed.

Examples of the filler include an inorganic filler and an organic filler, and an inorganic filler is preferred. As the inorganic filler, heavy calcium carbonate is preferred. For example, for the inorganic filler and organic filler, the same inorganic filler and organic filler as for the porous substrate layer can be preferably used, respectively.

The content of the filler in the adhesive resin receiving layer is, from the viewpoint of preventing the penetration of the plasticizer into the laminate, preferably 30% by mass or less, more preferably 20% by mass or less, and further preferably 10% by mass or less. Further, this content may be 1% by mass or more.

<<Porosity>>

The porosity of the adhesive resin receiving layer is preferably 5% or less, more preferably 3% or less, and further preferably 0%. By setting the porosity to 5% or less, the route through which the plasticizer in the adhesive layer passes through the pores to reach the porous substrate layer can be reduced, and the function of incorporating the plasticizer into the adhesive resin receiving layer tends to be exhibited more effectively.

The thickness of the adhesive resin receiving layer is, from the viewpoint of suppressing swelling of the porous substrate layer, preferably 0.5 µm or more, and more preferably 1 µm or more. Further, from the viewpoint of adjusting the balance between the adhesive resin receiving layer side and the opposite side at the time of curling, the thickness of the adhesive resin receiving layer is preferably 10 µm or less, and more preferably 7 µm or less. From the viewpoint of obtaining a structure in which the amorphous resin is arranged in a layered manner in the crystalline resin, it is preferred that the adhesive resin receiving layer is stretched in at least one axis direction.

The laminate of the present invention can optionally have other layers. For example, from the viewpoint of improving adhesion with the ink used for printing, the laminate of the present invention can have a print receiving layer on the side opposite to the adhesive resin receiving layer of the porous substrate layer. Further, from the viewpoint of improving adhesion with the adhesive resin, the laminate of the present invention can also have a primer layer on the adhesive resin receiving layer.

Further, the laminate of the present invention can have a first intermediate layer on the side opposite to the adhesive resin receiving layer of the porous substrate layer, and can have a second intermediate layer between the porous substrate layer and the adhesive resin receiving layer. By having the first and second intermediate layers and adjusting the thickness of these layers, the balance between the strength of the overall layers laminated on both sides of the porous substrate layer and the stress produced by the difference in the shrinkage rate of the constituent materials can be controlled, making it easier to suppress the occurrence of curling.

Figure 1:
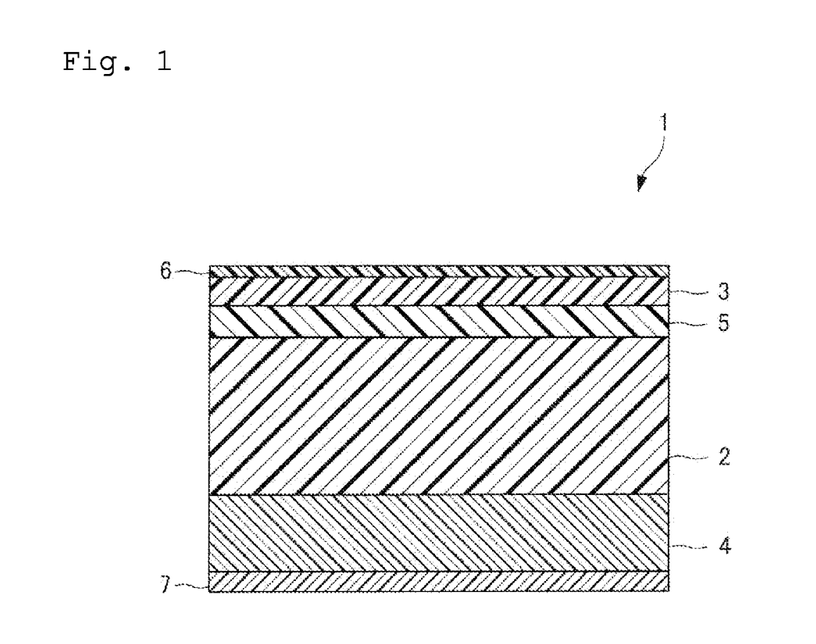
FIG. 1 is a cross-sectional view illustrating a structural example of a laminate of an embodiment.

FIG. 1 schematically illustrates a structural example of a laminate according to one embodiment of the present invention.

A laminate 1 illustrated in FIG. 1 has a print receiving layer 7, a first intermediate layer 4, a porous substrate layer 2, a second intermediate layer 5, an adhesive resin receiving layer 3, and a primer layer 6, in that order.

<Intermediate Layers>

The first intermediate layer is provided on the side opposite to the adhesive resin receiving layer of the porous substrate layer. When a print receiving layer is provided, the first intermediate layer is arranged between the porous substrate layer and the print receiving layer. Further, the second intermediate layer is arranged between the porous substrate layer and the adhesive resin receiving layer.

The intermediate layers may be a single-layer structure or a multilayer structure. In the case of a multilayer structure, the type and content of the composition of each layer may be the same or different.

As the materials constituting the first intermediate layer and the second intermediate layer, the same materials as for the porous substrate layer can be used. Here, from the viewpoint of cost reduction, it is preferred that the first intermediate layer and the second intermediate layer do not contain the amorphous resin, and the crystalline resin is the main component. From the viewpoint of imparting whiteness and opacity to the laminate, similar to the porous substrate layer, the intermediate layers may also have a porous structure.

From the viewpoint of improved opacity, reduced costs, and reduced shrinkage, the content of the filler in the first intermediate layer and the second intermediate layer is preferably 20% by mass or more, and more preferably 40% by mass or more. Further, from the viewpoint of increased uniformity of molding, the content of the filler in the first intermediate layer and the second intermediate layer is preferably 80% by mass or less, and more preferably 60% by mass or less.

Examples of the method for forming the porous structure include the same method similar as that for the porous substrate layer. From the viewpoint of imparting whiteness and opacity to the laminate, it is preferred that the first intermediate layer or the second intermediate layer are stretched in at least one axis.

If the first intermediate layer is porous, from the viewpoint of opacity and weight reduction, the porosity is preferably 1% or more, more preferably 2% or more, and further preferably 3% or more. On the other hand, from the viewpoint of stability during stretch-molding, the porosity is preferably 60% or less, more preferably 55% or less, further preferably 50% or less, and particularly preferably 40% or less.

If the second intermediate layer is porous, from the viewpoint of opacity and weight reduction, the porosity is preferably 5% or more, more preferably 10% or more, and further preferably 20% or more. On the other hand, from the viewpoint of stability during stretch-molding, the porosity is preferably 60% or less, more preferably 55% or less, further preferably 50% or less, and particularly preferably 40% or less.

If the intermediate layers have a multilayer structure, the porosity of the intermediate layer is the porosity when the whole multilayer structure is considered as a single structure.

The ratio of a thickness (T1) of the first intermediate layer to a thickness (T2) of the second intermediate layer (T1/T2) is preferably 1.2 or more, and more preferably 1.5 or more, while 100 or less is preferred, 5.0 or less is more preferred, and 3.5 or less is further preferred. By setting the ratio (T1/T2) to the above-described lower limit or more, warping of the laminate due to a shrinkage difference between the adhesive resin receiving layer provided only on one side of the laminate and other layers can be reduced, and by setting the ratio to the above-described upper limit or less, the thickness of the laminate can be reduced and the cost can be reduced. The optimal thickness of the first intermediate layer may be determined based on the content of the amorphous resin in the adhesive resin receiving layer. The greater the amount of the amorphous resin, the greater the warping of the laminate due to the adhesive resin receiving layer, which means that the first intermediate layer needs to be thicker in order to reduce the warping.

Specifically, the thickness of the first intermediate layer can be 10 to 100 μm, may be 12 to 90 μm, and may be 15 to 80 μm.

Further, the thickness of the second intermediate layer can be 1 to 50 μm, may be 10 to 50 μm, may be 12 to 45 μm, and may be 15 to 40 μm.

If the intermediate layer has a multilayer structure, the thickness of the intermediate layer is the thickness of the whole multilayer structure.

The laminate of the present invention has an asymmetric structure in which the adhesive receiving layer including the amorphous resin is provided on only one side. In general, crystalline resins are more prone to shrinkage than amorphous resins. Therefore, the porous substrate layer, first intermediate layer, and second intermediate layer, in which the crystalline resin is the main component, have properties which make those layers more likely to shrink than the adhesive resin receiving layer that includes the amorphous resin. Therefore, there is a difference in degree of shrinkage between the surface on the adhesive resin receiving layer side and the surface on the opposite side, and the laminate may warp and curl.

In contrast, by thickening the first intermediate layer as described above, which has a lower content of the shrinkage-causing crystalline resin and is less prone to shrinkage than the porous substrate layer, it is possible to alleviate the shrinkage of the opposite surface from the adhesive resin receiving layer, and the degree of shrinkage of both surfaces is balanced. As a result, the curling that can be caused by providing the adhesive resin receiving layer can be suppressed. On the other hand, this effect is not obtained even if the second intermediate layer is thickened. This is because the second intermediate layer is adjacent to the adhesive resin receiving layer. The second intermediate layer inherently shrinks to some degree, but by being fixed to the adhesive resin receiving layer, which hardly shrinks, the second intermediate layer is also less likely to shrink. Therefore, even if the second intermediate layer is thickened, the difference in shrinkage on both surfaces of the laminate does not decrease, and it is difficult to suppress the curling due to the difference in degree of shrinkage.

<Primer Layer>

The primer layer is provided on the adhesive resin receiving layer to increase adhesiveness between the adhesive resin receiving layer and the adhesive layer. Thus, when a laminate having a primer layer is used for an adhesive label, the adhesive strength between the adhesive label and an adherend can be improved.

The primer layer preferably contains an ethyleneimine polymer from the viewpoint of the adhesiveness with the adhesive layer, and further the adhesive strength between the label and the adherend. Examples of the ethyleneimine polymer include a polyethyleneimine or a polyethyleneimine adduct of a polyamine polyamide, and an alkylated product of a polyethyleneimine which has 1 to 8 carbon atoms.

Among these, from the viewpoint of adhesion with a hot melt-type adhesive resin, it is preferred to use a modified polyethyleneimine obtained by modifying a polyethyleneimine or a polyethyleneimine adduct of a polyamine polyamide with a halogenated alkyl, halogenated alkenyl, cycloalkyl halide, or benzyl halide having 1 to 24 carbon atoms. Here, the degree of polymerization of the ethyleneimine polymer may be arbitrary, but preferably 20 to 300.

The content of the ethyleneimine polymer in the primer layer is, from the viewpoint of improving adhesiveness, preferably 10% by mass or more, more preferably 15% by mass or more, and further preferably 20% by mass or more. On the other hand, from the viewpoint of a balance with other properties such as printability, the content is preferably 40% by mass or less, and more preferably 30% by mass or less.

As an active ingredient in the primer layer, additives such as an antistatic agent, a surfactant, and a filler can be appropriately selected as necessary. As the antistatic agent, for example, a quaternary ammonium salt-type copolymer can be used.

The thickness of the primer layer can be, for example, 0.01 μm or more, may be 0.02 μm or more, and may be 0.03 μm or more. The thickness can be 10 μm or less, may be 5 μm or less, may be 3 μm or less, may be less than 1 μm, and may be less than 0.5 μm. By setting the thickness of the primer layer to the above-described lower limit value or more, the adhesiveness between the adhesive resin receiving layer and the adhesive layer tends to be improved. Further, by setting the thickness of the primer layer to the above-described upper limit value or less, penetration of the plasticizer into the laminate can be further suppressed.

<Print Receiving Layer>

The print receiving layer is provided on the side opposite to the adhesive resin receiving layer of the porous substrate layer, and serves as the base layer of the printed layer. If a first intermediate layer is provided, the print receiving layer is provided between the first intermediate layer and the printed layer. As a result of the print receiving layer, blocking when storing multiple layers of the laminate on top of each other can be suppressed, and the adhesiveness with the printed layer can be increased.

From the viewpoint of antistatic properties, the print receiving layer preferably contains a quaternary ammonium salt-type copolymer. Further, the print receiving layer may also contain the above-described ethyleneimine polymer. From the viewpoint of antistatic properties, the content of the quaternary ammonium salt-type copolymer in the print receiving layer is preferably 40% by mass or more, more preferably 50% by mass or more, and further preferably 60% by mass or more. On the other hand, from the viewpoint of the balance with other properties, the above content is preferably 90% by mass or less, and more preferably 80% by mass or less.

The thickness of the print receiving layer can be, for example, 0.01 to 10 μm, may be 0.02 to 5 μm, and may be 0.03 to 3 μm.

Although an aspect in which laminate has a print receiving layer, an intermediate layer, and a primer layer has been described, from the viewpoint of obtaining a practical effect on the imparting the feel of paper to the laminate and suppressing curling due to swelling, it is not required that the laminate have these layers. For example, if the laminate does not have a primer layer, the adhesive resin receiving layer constitutes the top surface of the laminate and is provided so as to be in direct contact with the adhesive layer, and therefore penetration of the plasticizer into the laminate is further suppressed, and curling due to swelling can be suppressed much more.

(Hot Melt-Type Adhesive Label)

The adhesive label of the present invention is a hot melt-type that has the above-described laminate and a hot melt-type adhesive layer on the surface on the adhesive resin receiving layer side of the laminate. A release film may optionally be arranged on the surface of the adhesive layer.

As described above, since the adhesive resin receiving layer suppresses the migration of the plasticizer into the porous substrate layer, an adhesive label can be provided which suppresses curling due to swelling of the porous substrate layer even when the plasticizer in the adhesive layer has migrated to the laminate side.

The adhesive label of the present invention can form a printed layer by printing on the side opposite to the adhesive layer of the laminate.

Figure 2:
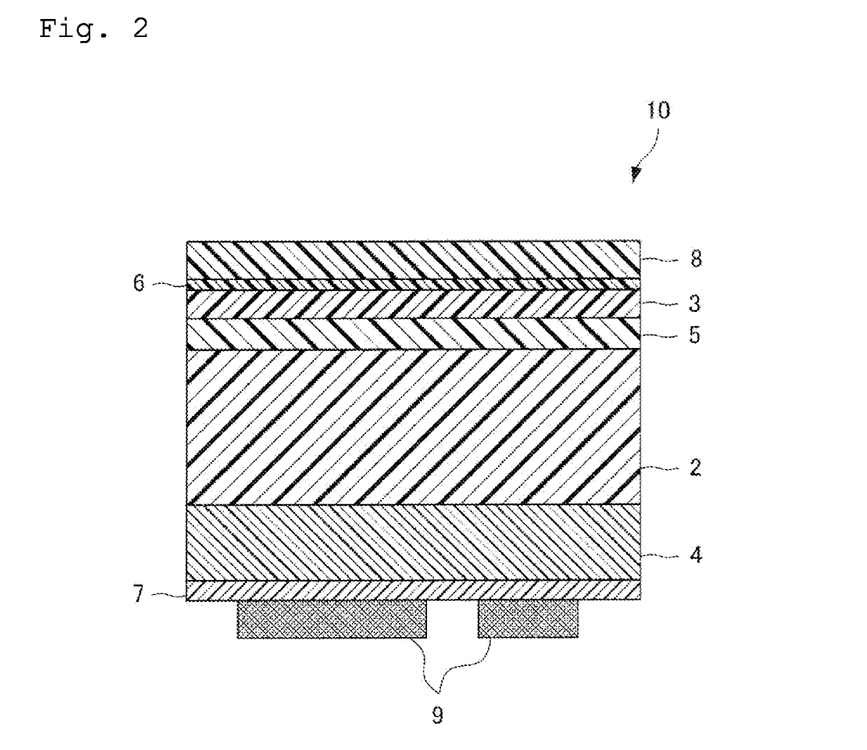
FIG. 2 is a cross-sectional view illustrating a structural example of a hot melt-type adhesive label of an embodiment.

FIG. 2 schematically illustrates a structural example of an adhesive label according to one embodiment of the present invention.

A hot melt-type adhesive label 10 illustrated in FIG. 2 has a laminate 1 and an adhesive layer 8. The adhesive layer 8 is provided on the surface of the adhesive resin receiving layer 3 side of the laminate 1. Since the laminate 1 has a primer layer 6 on the adhesive resin receiving layer 3, in FIG. 2 the adhesive layer 8 is laminated on the primer layer 6.

Further, the adhesive label 10 may be provided with a printed layer 9 on the opposite surface to the adhesive layer 8 of the laminate 1 by printing. Since the laminate 1 has the print receiving layer 7 on the adhesive layer 8 side, in FIG. 2 the printed layer 9 is laminated on the print receiving layer 7.

<Adhesive Layer>

The adhesive layer contains a hot melt-type adhesive resin (hereinafter, sometimes simply referred to as an "adhesive resin"), a tackifier, a plasticizer, a wax, a filler, a stabilizer, and the like. That is, the adhesive layer is a hot melt-type adhesive layer that does not use a solvent and does not require a drying step to form the adhesive layer.

Examples of the adhesive resin include known resins that normally melt and adhere by heating at 50 to 250° C., such as an ethylene vinyl acetate copolymer, a polyolefin resin, a polyamide resin, an elastomer, an acrylic resin, and a polyurethane resin. The adhesive resin component is appropriately selected according to the material and the like of the adherend.

Examples of the tackifier include rosins, petroleum resins, and terpene resins.

Examples of the plasticizer include petroleum-based plasticizers such as process oils, plant-based plasticizers such as vegetable oils, liquid rubber plasticizers, and synthetic plasticizers such as ester-based plasticizers. Examples of the process oil include naphthene, paraffin, and aroma-based oils. Examples of the vegetable oil include sunflower oil and tall oil. Examples of the liquid rubber include polybutene. Examples of the ester-based plasticizer include phthalates, adipates, and phosphates. Among these, the present inventors found that when a process oil or the like having a relatively low polarity is used as the plasticizer, and particularly when naphthene or a paraffin-based oil is used, the swelling of laminate, namely, curling, occurs. However, with the laminate described above, even when such a plasticizer is used in the adhesive layer, it is possible to suppress the swelling of the laminate and to suppress curling due to swelling.

The SP value of the plasticizer can be, for example, about 6 to 10 or about 7 to 9, according to the adhesive resin.

The content of the plasticizer in the adhesive layer is, from the viewpoint of melt viscosity control, usually 10 to 50% by mass, and can be 20 to 45% by mass.

Examples of the wax include paraffin wax. Examples of the filler include talc and titanium oxide. As the stabilizer, for example, a hindered phenol or the like is used.

The adhesive layer can be formed by coating. The coating amount of the adhesive layer is usually 10 to 50 g/m$^2$, and can be about 20 to 40 g/m$^2$.

<Printed Layer>

The printed layer is provided by printing. The printing method is not particularly limited, and a known printing method such as gravure printing, offset printing, flexographic printing, seal printing, screen printing, dry electronic photography, wet electronic photography, a UV-curable ink-jet method, and the like can be used. Further, according to the printing method, inks such as oily inks, oxidative polymerization curing-type inks, UV curable inks, water-based inks, and liquid toners (also called electronic inks) can be used.

(Method for Producing Laminate)

The laminate of the present invention can be produced by laminating the adhesive resin receiving layer on the porous substrate layer.

Examples of the lamination method that can be used include a co-extrusion method, an extrusion lamination method, a film bonding method, and a coating method.

In the co-extrusion method, since the resin composition of each layer is supplied to a multilayer die, and laminated and melt-extruded in the multilayer die, lamination is performed at the same time as molding.

In the extrusion lamination method, the porous substrate layer is molded first, the resin composition for the adhesive resin receiving layer is melt-extruded thereon, and the resultant laminate is nipped by a roll while cooling, and therefore molding and lamination are performed in separate steps.

In the film bonding method, a porous substrate and the adhesive resin receiving layer are each film-molded and bonded together via a pressure-sensitive adhesive, and therefore molding and lamination are performed in separate steps. Examples of the method for molding the film include cast molding, calendering, rolling, and inflation molding, in which molten resin is extruded in a sheet shape by a single layer or multilayer T die, I die, or the like connected to a screw type extruder.

Among these methods, the co-extrusion method is preferred because each layer can be strongly adhered.

When laminating another layer including a thermoplastic resin, such as the first intermediate layer as well, the layer can be laminated in a similar way to the adhesive rein receiving layer.

Each layer containing a thermoplastic resin may be a non-stretched film or a stretched film. The adhesive resin receiving layer is preferably a stretched film that has been stretched at least in one axis from the viewpoint of suppressing penetration of the plasticizer. When stretching multiple layers, each layer may be stretched individually before lamination, or the layers may be stretched together after being laminated. Further, a stretched layer may be stretched again after lamination.

Examples of the stretching method include a longitudinal stretching method using the peripheral speed difference of a group of rolls, a transverse stretching method using a tenter oven, a sequential biaxial stretching method combining these, a rolling method, a simultaneous biaxial stretching method by a combination of a tenter oven and a pantograph, and a simultaneous biaxial stretching method by a combination of a tenter oven and a linear motor. A simultaneous biaxial stretching (inflation molding) method in which a molten resin is extruded and molded in the form of a tube using a circular die connected to a screw extruder, and then air is blown into the extrudate, and the like can also be used.

In the case where the thermoplastic resins used in each layer are amorphous resins, the stretching temperature when performing stretching is preferably within a range equal to or more than the glass transition point temperatures of the thermoplastic resins. Further, in the case where the thermoplastic resins used in the layers are crystalline resins, the stretching temperature is preferably within a range equal to or more than the glass transition point of the amorphous portion of the thermoplastic resins, and in a range equal to or less than the melting point of the crystal portion of the thermoplastic resins. Specifically, a temperature 2 to 60° C. lower than the melting points of the thermoplastic resins is preferred.

The stretching speed of the thermoplastic resin film is not particularly limited but is preferably within the range of 20 to 350 m/min from the viewpoint of stable stretch-molding.

Further, the stretching ratio when the thermoplastic resin film is stretched can also be appropriately determined considering the properties of the thermoplastic resin used, and the like.

When the thermoplastic resin film is stretched in one direction, the stretching ratio is usually about 1.1 times or more and about 15 times or less. The stretching ratio in the case of biaxial stretching is usually about 1.5 times or more and about 100 times or less in terms of area stretching ratio. For example, when a thermoplastic resin film including a homopolymer of propylene or a copolymer thereof is stretched in one direction, the stretching ratio is usually about 1.2 times or more, and preferably 2 times or more, and is usually 12 times or less, and preferably 10 times or less. The stretching ratio in the case of biaxial stretching is usually 1.5 times or more, and preferably 10 times or more, and is usually 60 times or less, and preferably 50 times or less, in terms of area stretching ratio.

When a thermoplastic resin film including a polyester-based resin is stretched in one direction, the stretching ratio is usually 1.2 times or more, and preferably 2 times or more, and is usually 10 times or less, and preferably 5 times or less. The stretching ratio in the case of biaxial stretching is usually 1.5 times or more, and preferably 4 times or more, and is usually 20 times or less, and preferably 12 times or less, in terms of area stretching ratio.

Within the above-described range of the stretching ratio, the target porosity is obtained, and opacity tends to be improved. Further, the thermoplastic resin film is less likely to fracture, and stable stretch-molding tends to be possible.

The primer layer or print receiving layer can be formed by coating a coating liquid that includes the raw materials of each layer on the top surface of the laminate and drying. It is preferred that the coating liquid is water-soluble because process control is easy as well as from a safety viewpoint. The water-soluble coating liquid can be prepared by dissolving each component such as the quaternary ammonium salt-type copolymer and ethyleneimine polymer in an aqueous solvent. The aqueous solvent may be water, or may contain a water-soluble organic solvent, such as methyl alcohol, ethyl alcohol, isopropyl alcohol, acetone, methyl ethyl ketone, ethyl acetate, toluene, and xylene, with water as a main component. Containing water as a main component means that 50% by mass or more of the whole is water.

The coating and the drying of the coating film may be carried out in-line with the molding of the laminated resin film, or may be carried out off-line.

The coating of the coating liquid can be carried out using a coating apparatus such as a die coater, a bar coater, a roll coater, a lip coater, a gravure coater, a spray coater, a blade coater, a reverse coater, or an air knife coater.

The coating amount can be appropriately adjusted considering the thickness of the resin coating after drying, the concentrations of the contained components, and the like.

The drying of the coating film can be carried out using a drying apparatus such as a hot air blower and an infrared dryer.

(Method for Producing Adhesive Label)

The adhesive label of the present invention can be produced by laminating the adhesive layer on the surface of the adhesive resin receiving layer side of the above-described laminate. When the laminate includes a primer layer, the surface on the adhesive resin receiving layer side is the primer layer, and when the laminate does not include a primer layer, the surface on the adhesive resin receiving layer side is the adhesive resin receiving layer.

Examples of the method for laminating the adhesive layer include a coating method, a co-extrusion method, an extrusion lamination method, and a film bonding method.

A printed layer can be provided by printing on the opposite surface to the adhesive resin receiving layer of the laminate. Examples of printing information include a product display, such as a product name or a logo, the manufacturer, the name of the sales company, the method of use, and a barcode.

EXAMPLES

Hereinafter, the present invention will be further described in detail by way of examples, but the present invention is not limited to the following examples to the extent that the gist thereof is not exceeded. Unless stated otherwise, the words "parts", "%", and the like in the examples are described on a mass basis.

(Preparation of Resin Composition)

<Resin Composition (1)>

A resin composition (1) was prepared by mixing 80.0 parts by mass of the polypropylene resin (product name: Novatec PP MA3, manufactured by Japan Polypropylene Corporation, degree of crystallinity: 46%, SP value: 8.1), 19.5 parts by mass of the heavy calcium carbonate particles (product name: Softon 1800, manufactured by Bihoku Funka Kogyo Co., Ltd., average particle size: 0.21 μm), and 0.5 parts by mass of the titanium dioxide particles (product name: Tipaque CR-60, manufactured by Ishihara Sangyo Kaisha Ltd., average particle size: 1.25 μm) listed in Table 1.

<Resin Composition (2)>

A resin composition (2) was prepared by mixing 50.0 parts by mass of the polypropylene resin (product name: Novatec PP MA3, manufactured by Japan Polypropylene Corporation, SP value: 8.1), 49.5 parts by mass of the heavy calcium carbonate particles (product name: Softon 1800, manufactured by Bihoku Funka Kogyo Co., Ltd.), and 0.5 parts by mass of the titanium dioxide particles (product name: Tipaque CR-60, manufactured by Ishihara Sangyo Kaisha Ltd.) listed in Table 1.

<Resin Composition (3)>

A resin composition (3) was prepared by mixing 48.5 parts by mass of the polypropylene resin (product name: Novatec PP FL4, manufactured by Japan Polypropylene Corporation, degree of crystallinity: 53%, SP value: 8.1), 48.5 parts by mass of the cyclic olefin resin (product name: Apel 6011T, manufactured by Mitsui Chemicals, Inc., SP value: 7.2), and 3.0 parts by mass of the heavy calcium carbonate particles (product name: Softon 1800, manufactured by Bihoku Funka Kogyo Co., Ltd.) listed in Table 2.

<Resin Composition (4)>

A resin composition (4) was prepared by mixing 97.0 parts by mass of the cyclic olefin resin (product name: Apel 6011T, manufactured by Mitsui Chemicals, Inc., SP value: 7.2) and 3.0 parts by mass of the heavy calcium carbonate particles (product name: Softon 1800, manufactured by Bihoku Funka Kogyo Co., Ltd.) listed in Table 2.

<Resin Composition (5)>

A resin composition (5) was prepared by mixing 77.6 parts by mass of the polypropylene resin (product name: Novatec PP FL4, manufactured by Japan Polypropylene Corporation, SP value: 8.1), 19.4 parts by mass of the cyclic olefin resin (product name: Apel 6011T, manufactured by Mitsui Chemicals, Inc., SP value: 7.2), and 3.0 parts by mass of the heavy calcium carbonate particles (product name: Softon 1800, manufactured by Bihoku Funka Kogyo Co., Ltd.) listed in Table 2.

<Resin Composition (6)>

A resin composition (6) was prepared by mixing 87.3 parts by mass of the polypropylene resin (product name: Novatec PP FL4, manufactured by Japan Polypropylene Corporation, SP value: 8.1), 9.7 parts by mass of the cyclic olefin resin (product name: Apel 6011T, manufactured by Mitsui Chemicals, Inc., SP value: 7.2), and 3.0 parts by mass of the heavy calcium carbonate particles (product name: Softon 1800, manufactured by Bihoku Funka Kogyo Co., Ltd.) listed in Table 2.

<Resin Composition (7)>

A resin composition (7) was prepared by mixing 48.5 parts by mass of the polypropylene resin (product name: Novatec PP FL4, manufactured by Japan Polypropylene Corporation, SP value: 8.1), 48.5 parts by mass of the petroleum resin (product name: Arcon P-140, manufactured by Arakawa Chemical Industries Ltd., SP value: 7.0), and 3.0 parts by mass of the heavy calcium carbonate particles (product name: Softon 1800, manufactured by Bihoku Funka Kogyo Co., Ltd.) listed in Table 2.

<Resin Composition (8)>

A resin composition (8) was prepared by mixing 48.5 parts by mass of the polypropylene resin (product name: Novatec PP FL4, manufactured by Japan Polypropylene Corporation, SP value: 8.1), 48.5 parts by mass of the polystyrene resin (product name: HIPS 475D, manufactured by PS Japan Corporation, SP value: 8.9), and 3.0 parts by mass of the heavy calcium carbonate particles (product name: Softon 1800, manufactured by Bihoku Funka Kogyo Co., Ltd.) listed in Table 2.

<Resin Composition (9)>

A resin composition (9) was prepared by mixing 48.5 parts by mass of the polypropylene resin (product name: Novatec PP FL4, manufactured by Japan Polypropylene Corporation, SP value: 8.1), 48.5 parts by mass of the polyethylene terephthalate resin (product name: TRN-8550FF, manufactured by Teijin Limited, SP value: 10.7), and 3.0 parts by mass of the heavy calcium carbonate particles (product name: Softon 1800, manufactured by Bihoku Funka Kogyo Co., Ltd.) listed in Table 2.

<Resin Composition (10)>

A resin composition (10) was prepared by mixing 97.0 parts by mass of the polypropylene resin (product name: Novatec PP FL4, manufactured by Japan Polypropylene Corporation, SP value: 8.1) and 3.0 parts by mass of the heavy calcium carbonate particles (product name: Softon 1800, manufactured by Bihoku Funka Kogyo Co., Ltd.) listed in Table 2.

Tables 1 and 2 show the compositional makeup of each resin composition. The SP values in the tables are values calculated using Small's equation described above.

TABLE 1

| | | SP value (calculated value) | Porous substrate layer [parts by mass] Resin composition (1) | Intermediate layer [parts by mass] Resin composition (2) |
|---|---|---|---|---|
| Crystalline resin | Polypropylene resin (product name: name: Novatec PP MA3, manufactured by Japan Polypropylene Corporation, MFR (230° C., 2.16 kg load): 11 g/10 min, degree of crystallinity: 46%) | 8.1 | 80.0 | 50.0 |
| | Polypropylene resin (product name: name: Novatec PP FL4, manufactured by Japan Polypropylene Corporation, MFR (230° C., 2.16 kg load): 4 g/10 min, degree of crystallinity: 53%) | 8.1 | — | — |
| Amorphous resin | Cyclic olefin resin (product name: Apel 6011T, manufactured by Mitsui Chemicals, Inc., MFR (260° C., 2.16 kg load): 26 g/10 min,) | 7.2 | — | — |
| | Petroleum resin (product name: Arcon P-140, manufactured by Arakawa Chemical Industries Ltd., softening point (JIS K2207): 140° C.) | 7.0 | — | — |
| | Polystyrene resin (product name: HIPS 475D, manufactured by PS Japan Corporation, MFR (200° C., 2.16 kg load): 2 g/10 min) | 8.9 | — | — |
| | Polyethylene terephthalate resin (product name: TRN-8550FF, manufactured by Teijin Limited, melting point (DSC method) 252° C.) | 10.7 | — | — |

TABLE 1-continued

|  |  | SP value (calculated value) | Porous substrate layer [parts by mass] Resin composition (1) | Intermediate layer [parts by mass] Resin composition (2) |
|---|---|---|---|---|
| Inorganic filler | Heavy calcium carbonate particles (product name: Softon 1800, manufactured by Bihoku Funka Kogyo Co., Ltd., average particle size: 1.25 μm) | — | 19.5 | 49.5 |
|  | Rutile titanium dioxide particles (product name: Tipaque CR-60, manufactured by Ishihara Sangyo Kaisha Ltd., average particle size: 0.21 μm) | — | 0.5 | 0.5 |

TABLE 2

|  |  | SP value (calculated value) | Adhesive resin receiving layer [parts by mass] | | |
|---|---|---|---|---|---|
|  |  |  | Resin composition (3) | Resin composition (4) | Resin composition (5) |
| Crystalline resin | Polypropylene resin (product name: name: Novatec PP MA3, manufactured by Japan Polypropylene Corporation, MFR (230° C., 2.16 kg load): 11 g/10 min, degree of crystallinity: 46%) | 8.1 | — | — | — |
|  | Polypropylene resin (product name: name: Novatec PP FL4, manufactured by Japan Polypropylene Corporation, MFR (230° C., 2.16 kg load): 4 g/10 min, degree of crystallinity: 53)% | 8.1 | 48.5 | — | 77.6 |
| Amorphous resin | Cyclic olefin resin (product name: Apel 6011T, manufactured by Mitsui Chemicals, Inc., MFR (260° C., 2.16 kg load): 26 g/10 min,) | 7.2 | 48.5 | 97.0 | 19.4 |
|  | Petroleum resin (product name: Arcon P-140, manufactured by Arakawa Chemical Industries Ltd., softening point (JIS K2207): 140° C.) | 7.0 | — | — | — |
|  | Polystyrene resin (product name: HIPS 475D, manufactured by PS Japan Corporation, MFR (200° C., 2.16 kg load): 2 g/10 min) | 8.9 | — | — | — |
|  | Polyethylene terephthalate resin (product name: TRN-8550FF, manufactured by Teijin Limited, melting point (DSC method) 252° C.) | 10.7 | — | — | — |
| Inorganic filler | Heavy calcium carbonate particles (product name: Softon 1800, manufactured by Bihoku Funka Kogyo Co., Ltd., average particle size: 1.25 μm) | — | 3.0 | 3.0 | 3.0 |
|  | Rutile titanium dioxide particles (product name: Tipaque CR-60, manufactured by Ishihara Sangyo Kaisha Ltd., average particle size: 0.21 μm) | — | — | — | — |

|  |  | SP value (calculated value) | Adhesive resin receiving layer [parts by mass] | | |
|---|---|---|---|---|---|
|  |  |  | Resin composition (6) | Resin composition (7) | Resin composition (8) |
| Crystalline resin | Polypropylene resin (product name: name: Novatec PP MA3, manufactured by Japan Polypropylene Corporation, MFR (230° C., 2.16 kg load): 11 g/10 min, degree of crystallinity: 46%) | 8.1 | — | — | — |
|  | Polypropylene resin (product name: name: Novatec PP FL4, manufactured by Japan Polypropylene Corporation, MFR (230° C., 2.16 kg load): 4 g/10 min, degree of crystallinity: 53)% | 8.1 | 87.3 | 48.5 | 48.5 |
| Amorphous resin | Cyclic olefin resin (product name: Apel 6011T, manufactured by Mitsui Chemicals, Inc., MFR (260° C., 2.16 kg load): 26 g/10 min,) | 7.2 | 9.7 | — | — |
|  | Petroleum resin (product name: Arcon P-140, manufactured by Arakawa Chemical Industries Ltd., softening point (JIS K2207): 140° C.) | 7.0 | — | 48.5 | — |
|  | Polystyrene resin (product name: HIPS 475D, manufactured by PS Japan Corporation, MFR (200° C., 2.16 kg load): 2 g/10 min) | 8.9 | — | — | 48.5 |
|  | Polyethylene terephthalate resin (product name: TRN-8550FF, manufactured by Teijin Limited, melting point (DSC method) 252° C.) | 10.7 | — | — | — |

TABLE 2-continued

| | | | | | |
|---|---|---|---|---|---|
| Inorganic filler | Heavy calcium carbonate particles (product name: Softon 1800, manufactured by Bihoku Funka Kogyo Co., Ltd., average particle size: 1.25 μm) | — | 3.0 | 3.0 | 3.0 |
| | Rutile titanium dioxide particles (product name: Tipaque CR-60, manufactured by Ishihara Sangyo Kaisha Ltd., average particle size: 0.21 μm) | — | — | — | — |

| | | | Adhesive resin receiving layer [parts by mass] | |
|---|---|---|---|---|
| | | SP value (calculated value) | Resin composition (9) | Resin composition (10) |
| Crystalline resin | Polypropylene resin (product name: name: Novatec PP MA3, manufactured by Japan Polypropylene Corporation, MFR (230° C., 2.16 kg load): 11 g/10 min, degree of crystallinity: 46%) | 8.1 | — | — |
| | Polypropylene resin (product name: name: Novatec PP FL4, manufactured by Japan Polypropylene Corporation, MFR (230° C., 2.16 kg load): 4 g/10 min, degree of crystallinity: 53)% | 8.1 | 48.5 | 97.0 |
| Amorphous resin | Cyclic olefin resin (product name: Apel 6011T, manufactured by Mitsui Chemicals, Inc., MFR (260° C., 2.16 kg load): 26 g/10 min,) | 7.2 | — | — |
| | Petroleum resin (product name: Arcon P-140, manufactured by Arakawa Chemical Industries Ltd., softening point (JIS K2207): 140° C.) | 7.0 | — | — |
| | Polystyrene resin (product name: HIPS 475D, manufactured by PS Japan Corporation, MFR (200° C., 2.16 kg load): 2 g/10 min) | 8.9 | — | — |
| | Polyethylene terephthalate resin (product name: TRN-8550FF, manufactured by Teijin Limited, melting point (DSC method) 252° C.) | 10.7 | 48.5 | — |
| Inorganic filler | Heavy calcium carbonate particles (product name: Softon 1800, manufactured by Bihoku Funka Kogyo Co., Ltd., average particle size: 1.25 μm) | — | 3.0 | 3.0 |
| | Rutile titanium dioxide particles (product name: Tipaque CR-60, manufactured by Ishihara Sangyo Kaisha Ltd., average particle size: 0.21 μm) | — | — | — |

(Preparation of Coating Agent (A))

A water-soluble coating agent (A) composed of 100 parts by mass of the quaternary ammonium salt-type copolymer (manufactured by Mitsubishi Chemical Corporation, product name: Saftomer ST-1100) and 25 parts by mass of the polyethyleneimine (manufactured by BASF, product name: Polymin SN) listed in Table 3 was prepared.

TABLE 3

| | Coating agent (A) [parts by mass] |
|---|---|
| Quaternary ammonium salt-type copolymer (product name: Saftomer ST-1100, manufactured by Mitsubishi Chemical Corporation) | 100 |
| Polyethyleneimine (product name: Polymin SN, manufactured by BASF) | 25 |
| Distilled water | 60.0 |

(Laminate Production)

Example 1

The resin compositions (1) to (3) were each melted and kneaded with separate extruders set to 270° C., the resin composition (2) and resin composition (3) were laminated on the surface of one side of the resin composition (1) inside a die, the resin composition (2) was laminated on the surface of the other side, and resultant laminate was co-extruded from one die. The obtained lamination sheet had an adhesive resin receiving layer (resin composition (3))/second intermediate layer (resin composition (2))/porous substrate layer (resin composition (1))/first intermediate layer (resin composition (2)) lamination structure. This lamination sheet was cooled by a cooling roll to obtain a non-stretched sheet. Next, the non-stretched sheet was reheated to 150° C., and then stretched by a factor of 4.8 times in the sheet flow direction utilizing the speed difference between the rolls to obtain a longitudinally-stretched resin film (uniaxially stretched film).

The coating agent (A) was coated on both surfaces of the above-obtained longitudinally-stretched resin film using a roll coater to form a primer layer so that the solid content of the coating film after drying was 1 g/m² per surface. As a result, a laminate with a thickness of 100 μm having a primer layer (coating agent (A), thickness 0.1 μm)/adhesive resin receiving layer (resin composition (3), thickness 5 μm)/second intermediate layer (resin composition (2), thickness 15 μm)/porous substrate layer (resin composition (1), thickness 40 μm)/first intermediate layer (resin composition (2), 40 μm), print receiving layer (coating agent (A), thickness 0.1 μm) lamination structure was obtained.

Examples 2 and 3

A laminate of each of Examples 2 and 3 was obtained in the same manner as in Example 1, except that the adhesive resin receiving layer was formed using the resin composition (4) or (5) instead of the resin composition (3) in Example 1.

Example 4

A laminate of Example 4 was obtained in the same manner as in Example 1, except that the adhesive resin receiving layer was formed using the resin composition (4) instead of the resin composition (3) in Example 1, and the thickness of the first intermediate layer was changed to 50 μm.

Example 5

A laminate of Example 5 was obtained in the same manner as in Example 1, except that the adhesive resin receiving layer was formed using the resin composition (5) instead of the resin composition (3) in Example 1, and the thickness of the first intermediate layer was changed to 35 μm.

Example 6

A laminate of Example 6 was obtained in the same manner as in Example 1, except that the adhesive resin receiving layer was formed using the resin composition (6) instead of the resin composition (3) in Example 1, and the thickness of the first intermediate layer was changed to 30 μm.

Example 7

A laminate of Example 7 was obtained in the same manner as in Example 1, except that the adhesive resin receiving layer was formed using the resin composition (7) instead of the resin composition (3) in Example 1.

Example 8

A laminate of Example 8 was obtained in the same manner as in Example 1, except that the adhesive resin receiving layer was formed using the resin composition (8) instead of the resin composition (3) in Example 1.

Example 9

A laminate of Example 9 was obtained in the same manner as in Example 1, except that the adhesive resin receiving layer was formed using the resin composition (9) instead of the resin composition (3) in Example 1.

Comparative Example 1

A laminate of Comparative Example 1 was obtained in the same manner as in Example 1, except that the adhesive resin receiving layer was formed using the resin composition (10) instead of the resin composition (3) in Example 1, the thickness of the first intermediate layer was changed to 30 μm, and the thickness of the second intermediate layer was changed to 25 μm.

Comparative Example 2

A laminate of Comparative Example 2 was obtained in the same manner as in Example 1, except that the adhesive resin receiving layer was formed using the resin composition (10) instead of the resin composition (3) in Example 1.

Comparative Example 3

A FOS-60 manufactured by Futamura Chemical Co., Ltd. (biaxially stretched polypropylene film (BOPP), thickness 60 μm) was used as a laminate of Comparative Example 3.

(Label Production)

A resin composition (11) was prepared by mixing 100 parts by mass of a styrene butadiene resin, 105 parts by mass of a rosin-based tackifier, 150 parts by mass of a terpene-based tackifier, and 100 parts by mass of process oil as a plasticizer (product name: NA Solvent, manufactured by NOF Corporation).

The resin composition (11) was coated on the surface on the adhesive resin receiving layer side of the laminates obtained in the examples and comparative examples, that is, on the primer layer, to form an adhesive layer. An adhesive label was obtained by bonding a release film on the adhesive layer. It is noted that the laminate of Comparative Example 2 did not have an adhesive resin receiving layer, and therefore the adhesive layer was formed on one surface.

(Evaluation Methods)

<Thickness>

The total thickness (μm) of the laminate was measured using a constant pressured thickness measurement instrument (device name: PG-01J, manufactured by Teclock Co., Ltd.) in accordance with JIS K 7130:1999, "Plastics—Film and sheeting—Determination of thickness".

Further, the thickness (μm) of each layer constituting the laminate was measured as follows. The laminate was cooled to a temperature of −60° C. or less with liquid nitrogen. A razor blade (product name: Proline Blade, manufactured by Schick Japan K.K.) was made to perpendicularly abut and cut a sample placed on a glass plate to prepare a sample for cross section measurement. Cross-sectional observation of the obtained sample was performed using a scanning electron microscope (device name: JSM-6490, manufactured by JEOL Ltd.), and the boundary lines of each layer were distinguished from the compositional appearance to determine the thickness proportion of each layer. The total thickness (μm) was multiplied by the thickness proportion of each layer to determine the thickness of each layer (μm).

<Porosity>

The porosity (%) of each layer in the laminate can be determined from the ratio of the area occupied by pores in a predetermined region of each layer in any arbitrary cross section of the laminate observed with an electron microscope.

Specifically, an arbitrary portion of the laminate to be measured was cut off, and the portion was embedded and solidified in an epoxy resin. Then, the portion was cut perpendicularly to the planar direction of the laminate to be measured using a microtome, and affixed to a sample observation stage such that the cut surface became the face to be observed. Gold, gold-palladium, or the like was vapor-deposited on the face to be observed. The cut surface of the laminate was observed with a scanning electron microscope at an arbitrary magnification facilitating the observation (e.g., magnification of 500 times to 3000 times), and the observed region was captured as image data. The obtained image data was subjected to image processing by an image analyzer, and the ratio (%) of the area of pore portion in the predetermined region of the sheet was determined and taken as the porosity. The measurement values of 10 or more arbitrary observed locations were averaged, and the calculated average can be taken as the porosity of each layer constituting the laminate.

<Feel>

The feel of the pulp paper of the laminate was evaluated based on the opacity of the laminate.

The opacity of the laminate can be determined in accordance with JIS P8149:2000 as a value expressed as a percentage of the ratio (black plate/white plate) of the reflectance of light when black and white standard plates are placed on the rear face.

The evaluation criteria for the feel of the pulp paper are as follows.
A: Opacity of 80% or more and a feel equivalent to that of pulp paper
B: Opacity of 70% or more to less than 80% and a sufficient pulp-paper feel
C: Opacity of less than 70% and an insufficient pulp-paper feel <Curling>

The adhesive labels obtained in the examples and comparative examples were left under room temperature (23° C.) and 50% relative humidity conditions. Next, the adhesive labels were placed flat on a table, the distance from the table to the end of each adhesive label was measured as a curling amount, and the elapsed time when the curling amount was 5 mm or more was measured. From the measured elapsed time and the curling amount of the adhesive label, suppression of curling by the laminate was evaluated according to the following criteria.
A: Even after 2 weeks, the curling amount was less than 5 mm and curling could be suppressed very effectively
B: After 2 weeks, the curling amount reached 5 mm and curling could be effectively suppressed
C: After 1 week, the curling amount reached 5 mm and curling could be suppressed to some extent
D: After 3 days, the curling amount reached 5 mm and curling could not be suppressed Table 4 shows the evaluation results.

TABLE 4

| | Adhesive resin receiving layer | | | Second intermediate layer | | | Substrate layer |
|---|---|---|---|---|---|---|---|
| | Resin composition No. | Ratio between amorphous resin and crystalline resin | Porosity [%] | Resin composition No. | Porosity [%] | Thickness [μm] | Resin composition No. |
| Example 1 | (3) | 50:50 | 0 | (2) | 30 | 15 | (1) |
| Example 2 | (4) | 100:0 | 0 | (2) | 30 | 15 | (1) |
| Example 3 | (5) | 20:80 | 0 | (2) | 30 | 15 | (1) |
| Example 4 | (4) | 100:0 | 0 | (2) | 30 | 15 | (1) |
| Example 5 | (5) | 20:80 | 0 | (2) | 30 | 15 | (1) |
| Example 6 | (6) | 10:90 | 0 | (2) | 30 | 15 | (1) |
| Example 7 | (7) | 50:50 | 0 | (2) | 30 | 15 | (1) |
| Example 8 | (8) | 50:50 | 0 | (2) | 30 | 15 | (1) |
| Example 9 | (9) | 50:50 | 0 | (2) | 30 | 15 | (1) |
| Comparative Example 1 | (10) | 0:100 | 0 | (2) | 30 | 25 | (1) |
| Comparative Example 2 | (10) | 0:100 | 0 | (2) | 30 | 15 | (1) |
| Comparative Example 3 | — | | | — | | | BOPP |

| | Substrate layer | First intermediate layer | | | | Evaluation | |
|---|---|---|---|---|---|---|---|
| | Porosity [%] | Resin composition No. | Porosity [%] | Thickness [μm] | Ratio of thickness with respect to second intermediate layer T1/T2 | Feel | Curling suppression |
| Example 1 | 35 | (2) | 30 | 40 | 2.7 | B | A |
| Example 2 | 35 | (2) | 30 | 40 | 2.7 | B | C |
| Example 3 | 35 | (2) | 30 | 40 | 2.7 | B | B |
| Example 4 | 35 | (2) | 30 | 50 | 3.3 | B | B |
| Example 5 | 35 | (2) | 30 | 35 | 2.3 | B | B |
| Example 6 | 35 | (2) | 30 | 30 | 2.0 | B | B |
| Example 7 | 35 | (2) | 30 | 40 | 2.7 | B | A |
| Example 8 | 35 | (2) | 30 | 40 | 2.7 | B | A |
| Example 9 | 35 | (2) | 30 | 40 | 2.7 | B | B |
| Comparative Example 1 | 35 | (2) | 30 | 30 | 1.2 | B | D |
| Comparative Example 2 | 35 | (2) | 30 | 40 | 2.7 | B | D |
| Comparative Example 3 | 0 | | | — | | D | C |

This application claims priority from Japanese Patent Application No. 2019-176349, which is a Japanese patent application filed on Sep. 27, 2019, herein incorporated by reference in its entirety.

REFERENCE SIGNS LIST 1 laminate
2 porous substrate layer
3 adhesive resin receiving layer
4 first intermediate layer
5 second intermediate layer
6 primer layer
7 print receiving layer
10 hot melt-type adhesive label
8 hot melt-type adhesive layer

The invention claimed is:

1. A laminate comprising: a porous substrate layer; and an adhesive resin receiving layer on one side of the porous substrate layer,
   wherein the adhesive resin receiving layer contains an amorphous resin;
   the porous substrate layer is a biaxially stretched layer comprising a filler; and
   a porosity of the porous substrate layer is 1-60%.

2. The laminate according to claim 1, wherein
   the amorphous resin is a thermoplastic resin having a dissolution parameter of 11 or less.

3. The laminate according to claim 1, wherein
   the amorphous resin is a cyclic olefin-type resin or a petroleum resin.

4. The laminate according to claim 1, wherein
   the adhesive resin receiving layer further contains a crystalline resin.

5. The laminate according to claim 4, wherein
   the amorphous resin in the adhesive resin receiving layer is arranged in a layered manner in the crystalline resin.

6. The laminate according to claim 4, wherein
   a content of the crystalline resin in the adhesive resin receiving layer is 20 to 85% by mass based on a total amount of the amorphous resin and the crystalline resin.

7. The laminate according to claim 1 comprising:
   a first intermediate layer on an opposite side to the adhesive resin receiving layer of the porous substrate layer; and
   a second intermediate layer between the porous substrate layer and the adhesive resin receiving layer.

8. The laminate according to claim 7, wherein
   a ratio of a thickness of the first intermediate layer to a thickness of the second intermediate layer is 1.2 to 100.

9. The laminate according to claim 1, comprising a primer layer on the adhesive resin receiving layer,
   wherein the primer layer contains a polyethyleneimine.

10. The laminate according to claim 1, wherein the filler content in the porous substrate layer is 10 to 70 mass %.

11. A hot melt-type adhesive label comprising a laminate, wherein
    the laminate comprises an adhesive resin receiving layer containing an amorphous resin between a hot melt-type adhesive layer containing a plasticizer and a porous substrate layer,
    the porous substrate layer is a biaxially stretched layer comprising a filler, and
    a porosity of the porous substrate layer is 1-60%.

12. The hot melt-type adhesive label according to claim 11, wherein
    the amorphous resin is a thermoplastic resin having a dissolution parameter of 11 or less.

13. The hot melt-type adhesive label according to claim 11, wherein
    the amorphous resin is a cyclic olefin-type resin or a petroleum resin.

14. A laminate comprising: a porous substrate layer; an adhesive resin receiving layer on one side of the porous substrate layer, and a primer layer on the adhesive resin receiving layer,
    wherein the adhesive resin receiving layer contains an amorphous resin;
    the porous substrate layer is a stretched layer comprising a filler, and
    the primer layer contains polyethylenimine.

* * * * *